United States Patent [19]

Uyama et al.

[11] Patent Number: 5,577,247
[45] Date of Patent: Nov. 19, 1996

[54] USER INFORMATION MANAGEMENT DEVICE TREATING COMMUNICATIONS FROM USER AS INFORMATION TO ALLOW SYSTEM TO ACCESS AND UPDATE INFORMATION ABOUT USER WITHOUT MODIFYING THE OVERALL SYSTEM

[75] Inventors: Masashi Uyama; Yutaka Hidai, both of Tokyo, Japan

[73] Assignee: New Media Development Association, Tokyo, Japan

[21] Appl. No.: 445,095

[22] Filed: May 19, 1995

Related U.S. Application Data

[63] Continuation of Ser. No. 911,079, Jul. 9, 1992, abandoned.

[30] Foreign Application Priority Data

Jul. 12, 1991 [JP] Japan ..................... 3-172822

[51] Int. Cl.⁶ .................................. G06F 17/30
[52] U.S. Cl. ............... 395/611; 364/222.82; 364/264; 364/284.3; 364/DIG. 1; 395/616
[58] Field of Search ............ 364/DIG. 1, DIG. 2; 395/600, 725, 275, 838, 893, 892, 700, 600

[56] References Cited

U.S. PATENT DOCUMENTS

| | | | |
|---|---|---|---|
| 4,775,935 | 10/1988 | Yourick | 364/401 |
| 4,932,021 | 6/1990 | Moody | 370/54 |
| 5,115,501 | 5/1992 | Kerr | 395/600 |
| 5,157,384 | 10/1992 | Greanias et al. | 345/156 |
| 5,252,951 | 10/1993 | Tannenbaum et al. | 345/156 |
| 5,263,165 | 11/1993 | Janis | 395/725 |

*Primary Examiner*—Thomas G. Black
*Assistant Examiner*—Maria N. Von Buhr
*Attorney, Agent, or Firm*—Armstrong, Westerman, Hattori, McLeland & Naughton

[57] ABSTRACT

A user information management device exploits the contents of all communications as information about an individual user, to allow the system to access and update information about the user without modifying the overall system. The system includes a task execution device and a user interface device which interact to perform a task as directed by a user by message communication through a shared medium. The system includes a user information management device and a reference table which includes message patterns for accessing and updating the information about the user and for launching access and update procedures corresponding to a matched pattern.

2 Claims, 5 Drawing Sheets

USER INFORMATION MANAGEMENT DEVICE TREATING COMMUNICATIONS FROM USER AS INFORMATION TO ALLOW SYSTEM TO ACCESS AND UPDATE INFORMATION ABOUT USER WITHOUT MODIFYING THE OVERALL SYSTEM

This application is a continuation application of Ser. No. 07/911,079, filed Jul. 9, 1992, now abandoned.

BACKGROUND OF THE INVENTION

The present invention relates to an information processing system which includes a user information management device for managing information about an individual user and enables information to be processed along the user's attributes.

FIG. 1 represents the structure of a conventional information processor. A user interface device 11 converts a user's operation into a message representing what a task execution device 12 is called upon to do and sends it to the task execution device 12. On receiving the message sent from the user interface device 11, the task execution device 12 processes the information to achieve the request represented by the message and in turn sends the consequence of processing back to the user interface device 11 as a message. A user information management device 13 stores information about the user which, for instance, consists of the user's preferences, interests and other attributes. The user interface and task execution devices 11 and 12 access the user information managed by the user information management device 13, as desired, for processing the information along the user's attributes. The user interface and task execution devices 11 and 12 update the user information managed by the user information management device 13, when needed.

In the conventional information processor, the user interface and task execution devices 11 and 12, the user interface and user information management devices 11 and 13, and the task execution and user information management devices 12 and 13 are respectively connected directly to each other.

In other words, the contents of communications exchanged between the user interface and the task execution devices 11 and 12 cannot be known from the user information management device 13. The procedures for accessing and updating the information about the user are independently encoded in the task execution and user interface devices 12 and 11, respectively.

A problem involved with this conventional information processor is that when some partial modifications are made to the user interface 11 or task execution device 12 so that some useful information about the user is added to the contents of communications between the user interface and user information management devices 11 and 13, the overall system construction should be modified so as to let the user information management device 13 acquire that information.

SUMMARY OF THE INVENTION

A primary object of this invention is to enable a user information management device to exploit the contents of all communications as information about an individual user, thereby allowing the system to access and update information about the user without modifying the overall system.

In order to accomplish the above-mentioned object, the present invention provides a system incorporating a user information management device for managing information about a user to process the information along the user's attributes, comprising:

a task execution device for performing information processing, a user interface device for doing interaction with the user, a shared medium for enabling a group of said devices to read and write various messages, and a user information management device for managing the information about the user and a reference table having message patterns for accessing and updating the information about the user and launching said procedures, said task execution and user interface devices being adapted to interactively do a user's task by message communication through said shared medium, and said user information management device being adapted to monitor the message sent to said shared medium and perform matching between said message and said message patterns managed thereby to launch the access and update procedures corresponding to the matched pattern, so that the information about the user can be exploited to perform information processing along the user's attributes and the information about the user can be dynamically acquired.

Preferably, said user information management device is characterized by a managing procedure for updating said reference table itself and a message pattern for launching said procedure.

The invention constructed above enables the user information management device to always monitor the message sent to the shared medium and check whether or not there is a match between that message and the message pattern, launching the access/update procedures. In consequence, it is possible to exploit the information about/he user and thereby perform information processing along the user's attributes and to acquire the information about the user dynamically. The user information management device manages a procedure for updating the reference table itself and a message pattern for launching said procedure, so that some information about the user required due to partial modifications to the user interface and task execution devices can be accessed/updated.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 3A is a drawing explaining operation of a user information management device with regard to a message sent from a task execution device, and the task execution device;

FIG. 3B is a drawing explaining operation of the task execution device and the user information management device with regard to the message sent by the user interface device;

FIG. 3C is a drawing explaining operation of the user information management device with regard to the message sent by the task execution unit; and FIG. 3D is a drawing explaining an operation by which the user information management device updates a keyword table.

DESCRIPTION OF PREFERRED EMBODIMENTS

Figure 2:
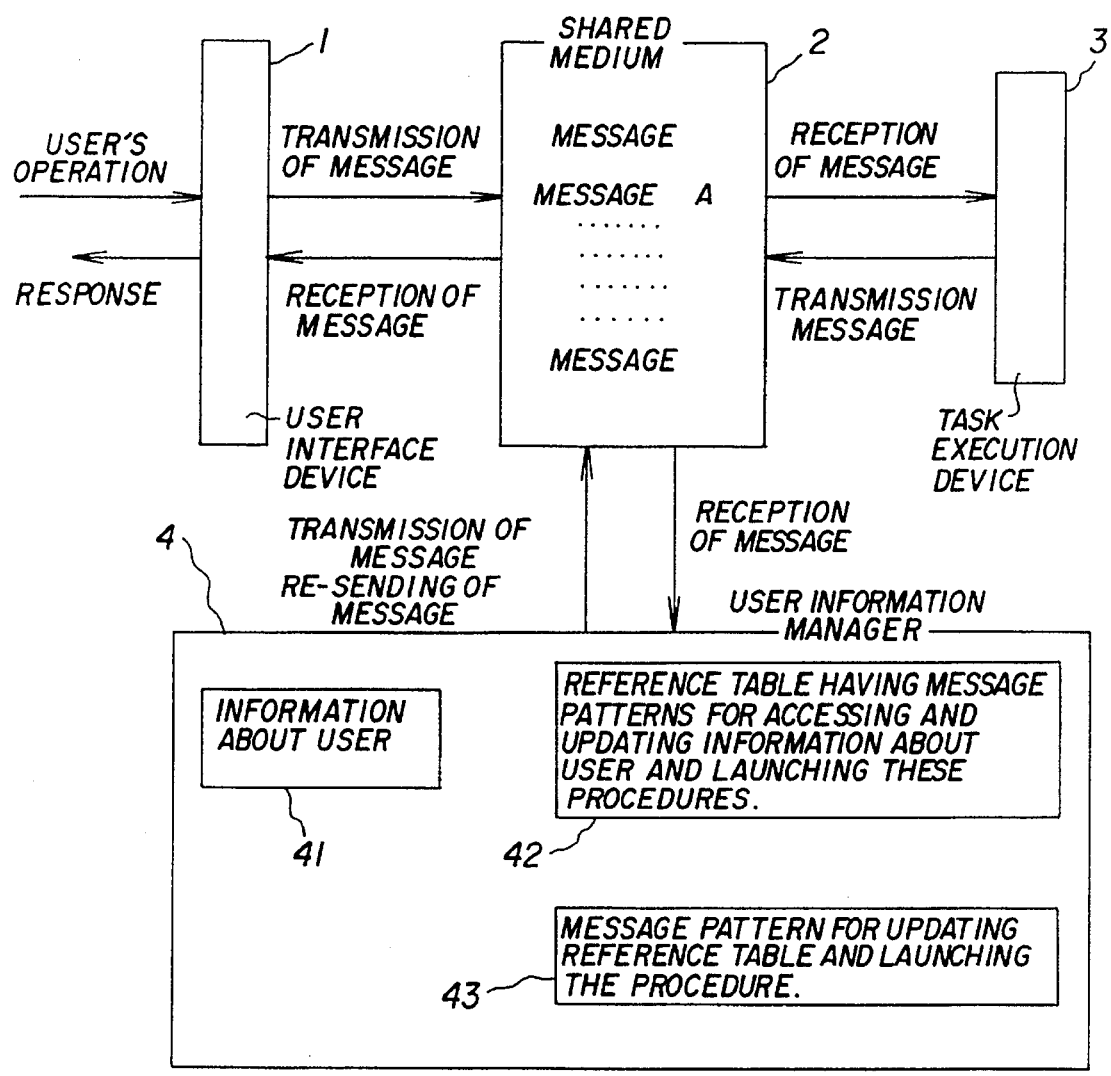
FIG. 2 illustrates one embodiment of the information-processing system for using and acquiring information about a user according to the invention.
Figure 1:
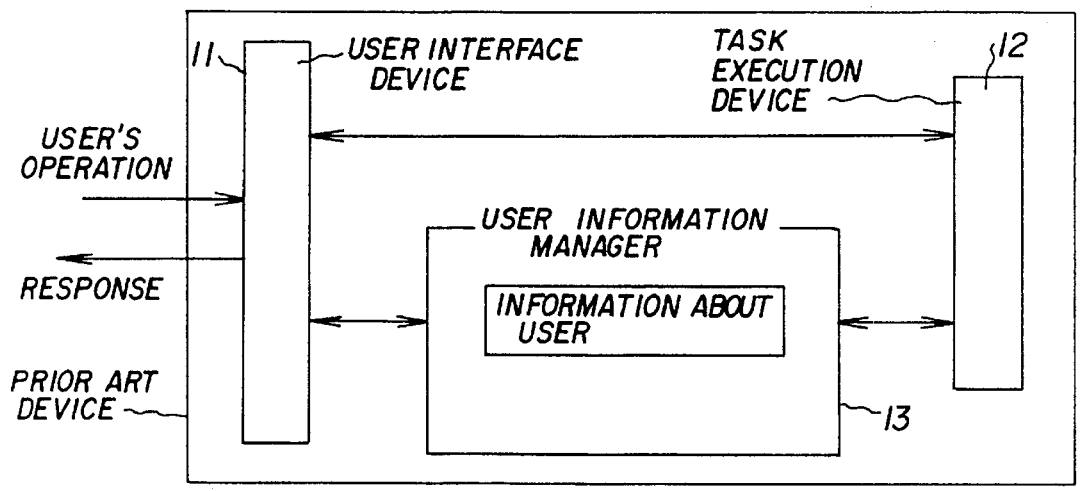
FIG. 1 illustrates the general structure of a conventional information-processing system.

Referring now to FIG. 2, a user interface device 1 converts a user's operation into a message representing what a task execution device 3 has to do and transmits it to a shared medium 2. The user interface device 1 is also operable to receive from the shared medium 2 a message representing a response from the task execution device 3 to this request to convert it into a relevant response to the user.

The task execution device or executer 3 receives from the shared medium 2 the message the user interface device 1 transmitted to process information for achieving the request represented by the message, and transmits the outcome of processing back to the shared medium 2 as a message.

The shared medium 2 is provided to receive the messages transmitted by each device group (the task execution or user interface device) and transfer them to another device Group (the task execution or user interface device) capable of receiving them. To perform the user's tasks, the messages are exchanged between the user interface device 1 and the task execution device 3 through the shared medium 2.

A user information management device or manager 4 includes information 41 about the user, such as her or his interests, preferences and other attributes, a reference table 42 for message patterns for accessing and updating the information about the user and launching the access procedure and updating procedure, and a message pattern 43 for updating and launching the reference table, and constantly monitors messages flowing through the shared medium 2 in such a way that when a message flows in the shared medium 2—said message matching with one of the patterns registered in the reference table 42 having the procedures for accessing and updating the information about the user and the message pattern for launching these procedures and the message pattern 43 for updating and launching the reference table 42, the shared medium 2 accepts this message to launch the procedures corresponding to that pattern, performing the following processings.

The user information management device 4 performs processings as follows. The first processing is to allow the task executer 3 or the user interface device 1 to provide the information about the user that is needed to do information processing along the user's attributes, the second to receive a message including the information about the user from messages transmitted to the shared medium 2 to store and update the information about the user, and the third to receive a message for changing the reference table 42 for message patterns for accessing and updating the information about the user and launching these procedures, thereby changing how to access and update the information about the user.

Messages accepted by the user information manager 4 are generally broken down into two types, one for accessing and the other for updating. The message for accessing is a query about the user's preferences, interests or attitudes inquired by the user interface device 1 or the task executer 3. Such a query message is to let the user interface device 1 and the task executer 3 select the response to the user and the execution of the task depending on the user's attributes. The message for updating is to update the information about the user and the reference table.

In the ensuing description, reference will now be made to how the user information manager 4 actually operates, when the user interface device 1 or the task executer 3 transmits a message A to the shared medium 2.

First, the user information management device 4 inspects whether or not the message A matches the message patterns on the message pattern reference table 42.

Then, if there is a match, the corresponding access or update procedure is launched to access or update the information about the user.

When accessed, a message representing the result is transmitted to the shared medium 2.

However, when there is a mismatch, further inspection is made of whether or not the message A matches the message pattern 43 for launching the procedure for updating the reference table 42.

And if there is a match, the corresponding procedure is then launched to update the reference table, but when there is a mismatch, nothing is done with respect to the message A.

After the completion of the inspection, the message A is sent back to the shared medium 2, so that other devices can receive it as well.

The present invention will be explained, by way of example, with reference to an information retrieval system. FIGS. 3A–3D illustrate the operation of the information-processing system for exploiting and acquiring information about a user according to this invention.

A task execution device 3 shown in FIGS. 3A–3D incorporate the function of retrieving from a text database the information demanded by a user, and a user interface device 1 incorporates the function of laying out indices incidental to the information thus retrieved on the screen in newspaper headline formats, allowing the user to select the indices, thereby providing her or him with the details of that information.

A user information manager 4 is operable to manage information 41 about the user in the form of a keyword table with the unit defined by a pair of a keyword representing the user's interests and its frequency of occurrence. The manager 4 then judges the information whose indices have been selected by the user and which has been read at great length by the user as being of great interest to the user, updating the frequency of occurrence with respect to the keyword incidental to that information. The task execution device 3 performs information retrieval according to the frequency of this keyword, while the user interface device 1 lays out the information according to the frequency of this keyword, thereby achieving information processing along the user's attributes.

Figure 3A:
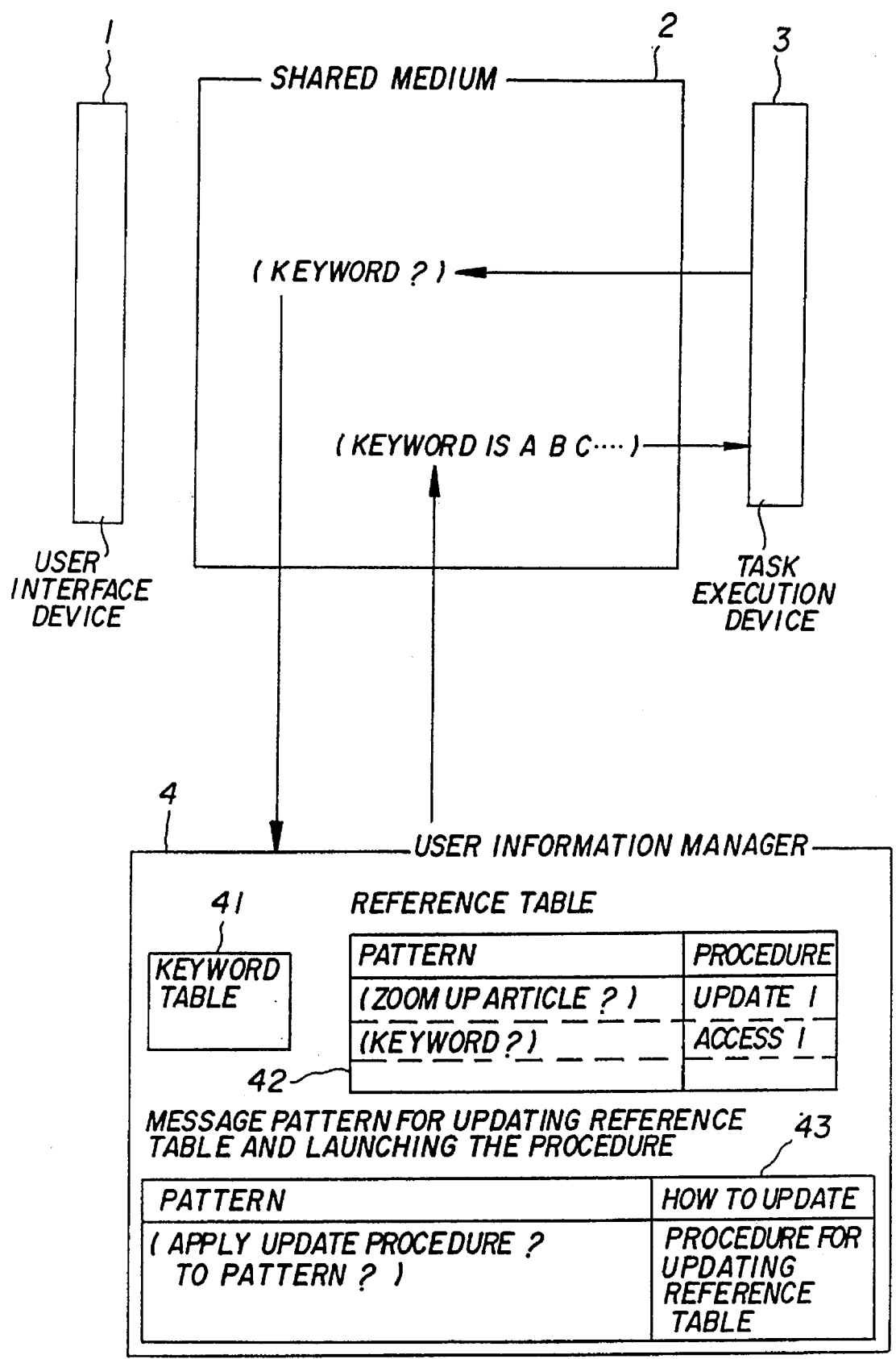
FIGS. 3A–3D are drawings explaining operation of an information management device for utilization and acquisition of user information of the present invention.

In the information-processing system set up above, now let the task executer 3 to send a message "WHAT IS THE KEYWORD ?", as illustrated in FIG. 3A. Then, the user information manager 4 refers to the reference table 42 to launch the corresponding access procedure (ACCESS 1) and in turn refers to the keyword table to send the result to the shared medium 2 in the form of a message "THE KEYWORD IS ABC . . . ". The task executer 3 uses this result to perform information retrieval along the user's concerns.

Figure 3B:
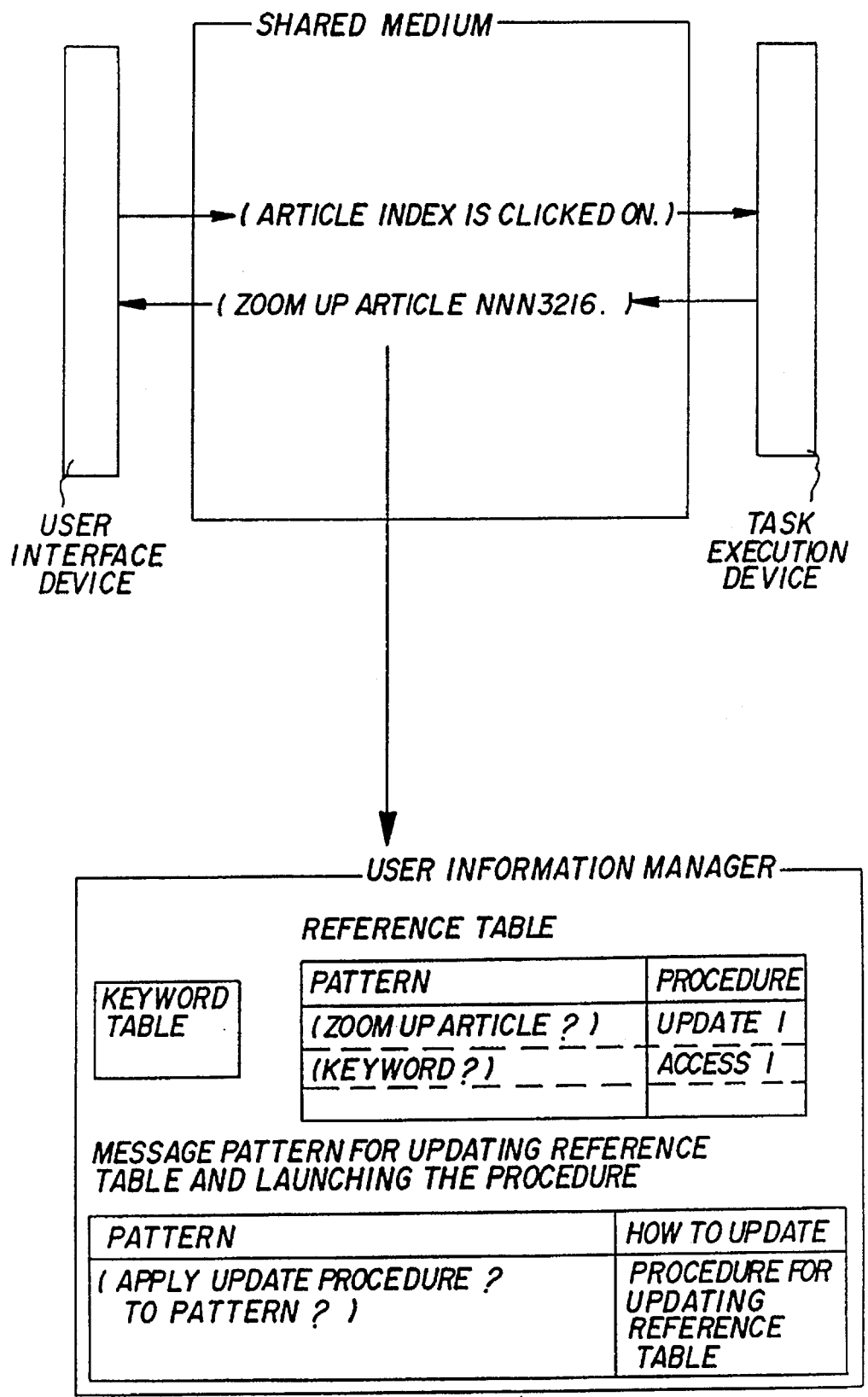

In the alternative, now let the task executer 3 receive a message "THE HEADLINE WAS CLICKED ON" from the user interface device 1, as illustrated in FIG. 3B. Then, the task executer 3 sends out a message "ZOOMING UP THE ARTICLE NNN3216", indicating to zoom up the article. On reception of this message, the user information manager 4 refers to the reference table 42 to launch the corresponding update procedure (UPDATE 1), updating the keyword table for the information 41 about the user. The message "ZOOM UP THE ARTICLE NNN3216" received by the user information manager 4 is again sent back to the shared medium 2, so that the user interface device 1 can receive it as well.

As mentioned above, the user information manager accesses and updates the information 41 about the user.

Now assume that the function of the task executer 3 to measure the time length during which the information is represented to the user is so extended that the frequency of the keyword can be updated in proportion to the time length during which the information is represented to the user.

Figure 3C:
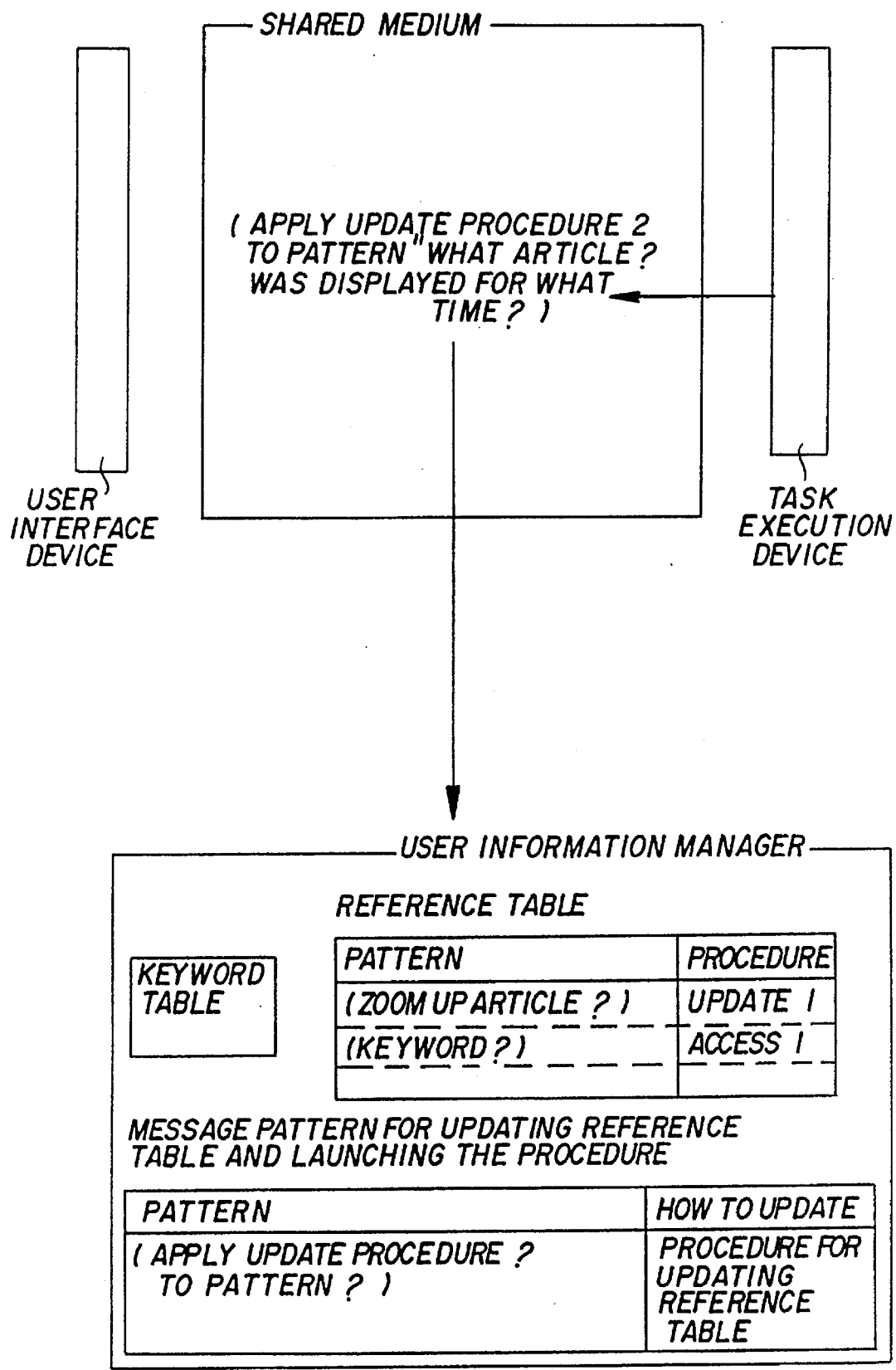

Then, as illustrated in FIG. 3C, the task executer 3 sends out to the user information manager 4 a message indicating to register a new pattern "APPLY UPDATE 2 TO THE PATTERN "WHAT ARTICLE WAS DISPLAYED FOR WHAT TIME ?"".

Upon reception of this message, the user information manager 4 makes reference to the message pattern 43 for updating the reference table to launch the reference table update procedure, adding a pair of this pattern and procedure to the reference table 42. Note that such a pattern, if already found in the reference table 42 at this time, is replaced.

Figure 3D:
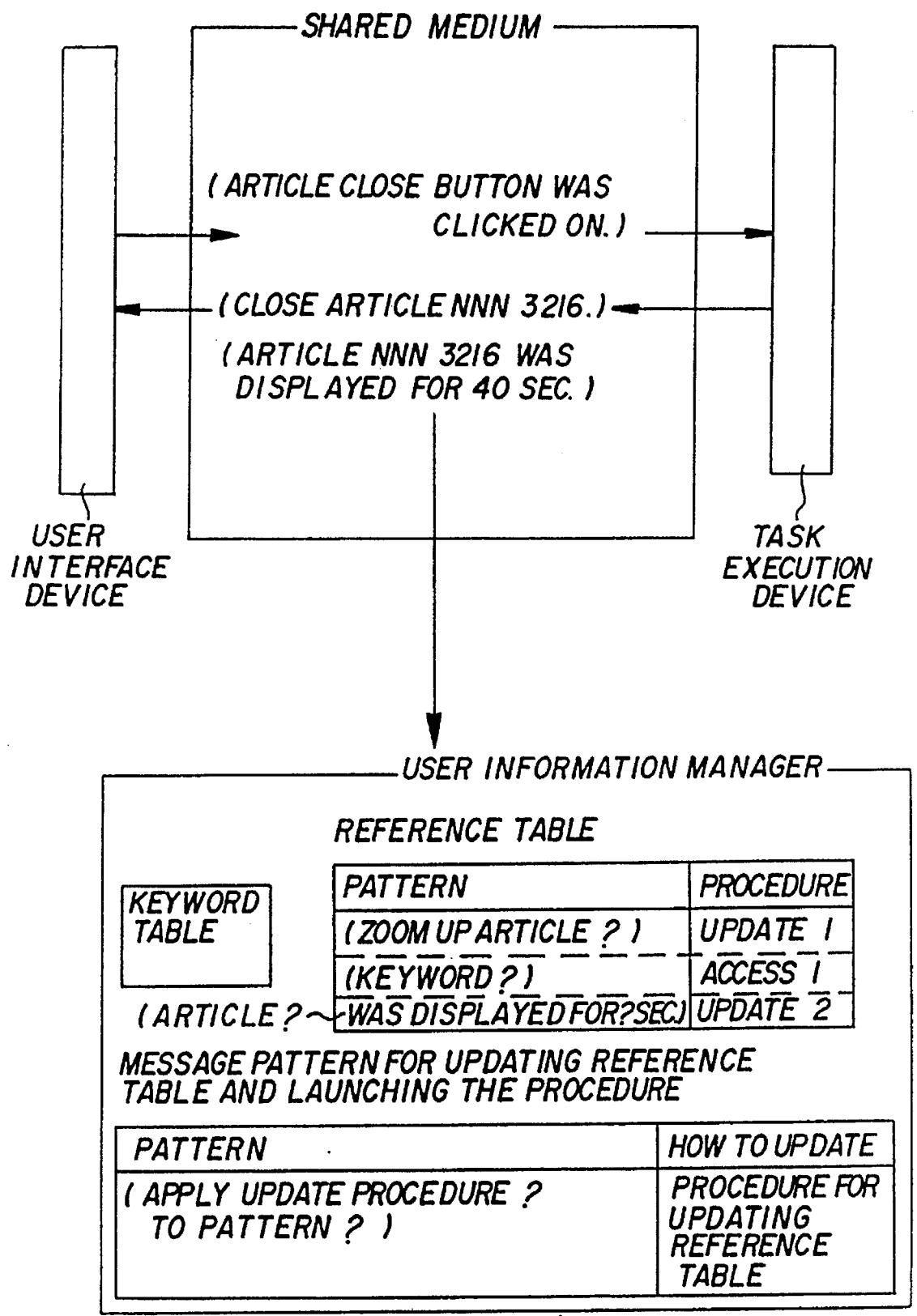

As illustrated in FIG. 3D, this also enables the user information manager 4 to update the keyword table with respect to a new pattern message "THE ARTICLE NNN3216 WAS DISPLAYED FOR 40 SECONDS" sent out of the task executer 3.

As has been explained above, the present invention allows the user interface and task execution devices to send messages to each other through the shared medium and the user information management device to monitor them, thereby enabling the user information management device to exploit the contents of all communications as the information about the user. Furthermore, the user information management device incorporates procedure for updating the message pattern reference table itself, which is operable to access and update the information about the user and launch these procedures, whereby another information about the user required due to partial modifications to the user interface and task execution devices can be accessed and updated without modifying the overall system.

What is claimed is:

1. A system including a user information management device for managing information about a user to process user operations by using stored information concerning user attributes, comprising:

a shared medium having a memory, for reading and writing messages in response to external commands;

a task execution device connected for communication with said shared medium, for performing information processing;

a user interface device connected for communication with said shared medium, for interacting with the user by receiving input from the user and providing responses to the user;

a user information management device connected for communication with said shared medium for storing and updating information concerning the user as user information, for managing said user information, and for updating a reference table having procedures for accessing or updating said user information, and message patterns for the initiation of said access procedures and update procedures, said user information management device comprising said user information, said reference table, and an updating table, having procedures for updating message patterns and procedures in said reference table and message patterns for performing the initiation of updating said reference table;

said user information management device monitoring messages sent to said shared medium either by said task execution device or by said user interface device, performs the initiating of access or update procedures when matching occurs between said message sent to said shared medium and said message patterns in said reference table, whereby information about the user is dynamically acquired, said user information management device monitoring messages sent to said shared medium either by said task execution device or by said user interface device, updates message patterns and procedures in said reference table when matching occurs between said message sent to said shared medium, and said message patterns in said updating table for matching against new messages sent for matching against new messages sent to said shared medium, whereby further information about the user is dynamically acquired and both said task execution device and said user interface device dynamically obtain further user information.

2. A system as claimed in claim 1, wherein said user information management device updates said reference table in response to said further information from the user.

* * * * *